United States Patent Office 3,067,655
Patented Dec. 11, 1962

3,067,655
ARTIFICIAL ICE AND SNOW AND METHODS OF MAKING THE SAME
Benjamin S. Miller, 313 N. Main St., Elsinore, Calif.
No Drawing. Filed Sept. 8, 1959, Ser. No. 838,388
7 Claims. (Cl. 94—3)

The present invention relates to artificial ice and snow which can be used for ice skating and skiing, although the compositions of matter involved herein have other applications.

An object of the invention is to provide improved compositions capable of use for ice skating at relatively elevated ambient temperatures, the composition being readily mixed and placed on a ground or floor surface. The invention has for a further objective, methods of making such artificial ice compositions.

Another object of the invention is to provide a composition capable of use as artificial snow that can be placed on a suitable sloping ground surface to function as a ski slope, and which will retain its snow-like consistency and characteristics at relatively elevated ambient temperatures. The invention is also directed to methods for producing such artificial snow compositions.

A further object of the invention is to provide a composition that is resistant to moisture and vermin, and which can be used, among other things, for insulation, burial vaults and coffins.

This invention possesses many other advantages, and has other objects which may be made more clearly apparent from a consideration of both the general and specific examples described in the present specification. Such examples will now be described in detail, for the purpose of illustrating the general principles of the invention. But it is to be understood that such detailed description is not to be taken in a limiting sense, since the scope of the invention is best defined by the appended claims.

In its general aspects the invention contemplates the production of artificial ice by coating fused borax glass in granular form and of a suitable mesh with acetic acid. The mixing is continued until the mixture is in a plastic state, whereupon it is dumped and spread onto a ground or floor surface to a desired thickness and smoothed with a roller. At ordinary outdoor temperatures, such as encountered in the summertime, the mixture will harden in approximately twenty minutes.

Following hardening of the aforementioned mixture of fused borax glass and acetic acid, polyglycol (for example, polypropylene glycol) or lard oil mixed with paraffin and this mixture is poured on the previously prepared surface. It is allowed to stand for a suitable length of time, which may be about two hours, resulting in a comparatively slippery surface suitable for ice skating. The slippery surface is provided by the polyglycol or lard oil and paraffin mixture.

In the above general formulation, a portion of the fused borax glass can be replaced with epsom salt. The general procedure, however, is substantially the same. The mixture of epsom salt, fused borax glass and acetic acid is first spread over the ground or floor surface and rolled smoothly, whereupon the lard oil or polyglycol and the paraffin is mixed together and spread on said surface.

More specifically, the following are examples of the artificial ice, the parts given being by weight:

Example 1

| | Parts |
|---|---|
| Fused borax glass in granular form (about 35 mesh) known by the trade name Pyrobar | 75 |
| Acetic acid (98% concentrate) | 12 |
| Lard oil or polyglycol (polypropylene glycol) | 6 |
| Parawax (paraffin) | 7 |

Example 2

| | Parts |
|---|---|
| Epsom salt | 7 |
| Fused borax glass in granular form (abuot 35 mesh) known by the trade name Pyrobar | 68 |
| Acetic acid (98% concentrate) | 12 |
| Lard oil or polyglycol (polypropylene glycol) | 6 |
| Parawax (paraffin) | 7 |

The above proportions in Examples 1 and 2 can be varied over substantial ranges, in accordance with the following example:

Example 3

| | Parts |
|---|---|
| Fused borax glass in granular form (about 35 mesh) known by the trade name Pyrobar | 68 to 82 |
| Acetic acid (98% concentrate) | 9 to 18 |
| Lard oil or polyglycol | 5 to 8 |
| Parawax (paraffin) | 4 to 10 |

In Example 3, a portion of the fused borax glass can be replaced by epsom salt, in amounts ranging from slightly above zero parts to about 7 parts, such as given in Example 2.

With the particular proportions of the mixture that may be used, the fused borax glass in granular form and acetic acid are mixed as described above, spread over the ground and the surface thereof placed in a smooth state, as by use of the roller. After being allowed to harden, the lard oil or polyglycol and the parawax are poured on the surface of the rolled mix, the surface being usable about two hours thereafter, as above described.

Artificial snow can be prepared by mixing fused borax glass in granular form and epsom salt together with sufficient acetic acid to make a granular mixture that is somewhat in the nature of soft, natural snow. It is then spread in a suitable thickness on top of artificial ice, which has previously been made and spread on the ground in either of the manners described above. After spreading the artificial snow on the ice, which may be approximately one-half hour later, sodium borate and paraffin oil are added to the surface of the artificial snow, which will make the surface appropriately slippery for use as a ski slope, or the like.

Specific examples of artificial snow are as follows, the parts given being by weight:

Example 4

| | Parts |
|---|---|
| Epsom salt | 59 |
| Fused borax glass in granular form (about 35 mesh) known by the trade name Pyrobar | 19 |
| Acetic acid (40% concentrate) | 9.6 |
| Sodium borate | 0.4 |
| Paraffin oil | 12 |

Example 5

| | |
|---|---|
| Epsom salt | 39 |
| Fused borax glass in granular form (about 35 mesh) known by the trade name Pyrobar | 39 |
| Acetic acid (40% concentrate) | 9.6 |
| Sodium Borate | 0.4 |
| Paraffin oil | 12.0 |

The epsom salt and fused borax glass are provided in a proportion to supply the artificial snow-like consistency. The relative proportions can be varied substantially from the examples given above. Sufficient of the acetic acid is also used to insure the proper mixture of the epsom salt, borax glass, and its appropriate spreading over the previously prepared artificial ice surface. The proportion of sodium borate can also be varied substantially. Its primary purpose is to make the ski slope surface with the artificial snow thereon slippery, which is also true of the paraffin oil, the proportions of which can also be varied to some extent from that given in the specific examples.

As stated above, the epsom salt and fused borax glass are mixed in a suitable mixer and the acetic acid added thereto, whereupon the mixture is spread on top of the artificial ice, which may have been placed on a sloping ground surface that is to function as a ski slope, and allowed to set, which by way of example may take about one-half hour. Thereafter, the sodium borate and the paraffin oil are mixed together and spread on the artificial snow surface.

In addition to its use as artificial ice, the composition set forth above in Examples 1, 2, 3 and 4, are also useful for other purposes. Hollow bricks can be made in a suitable form through use of the mixture which are found to have very good insulation properties. Walls and the like can be built up with such brick. It is also found that burial vaults and coffins can be made from the artificial ice formulations since the composition is found to be moisture proof and vermin proof.

The inventor claims:

1. A method of producing artificial ice comprising mixing from about 68 to 82 parts by weight fused granular borax glass with about 9 to 18 parts by weight acetic acid, spreading said mixture on the ground and smoothing its upper surface, and spreading a mixture on said surface of about 4 to 10 parts by weight of paraffin with about 5 to 8 parts by weight of a product selected from the group consisting of lard oil and polyglycol.

2. Artificial snow comprising a first layer of about 68 to 82 parts by weight fused granular borax glass and about 9 to 18 parts by weight acetic acid, a second layer of paraffin and polyglycol on the upper portion of said first layer, a third layer of epsom salt, fused borax glass and acetic acid on second layer, and a fourth layer of sodium borate and paraffin on said third layer.

3. Artificial snow according to claim 2 wherein the second layer consists essentially of the following proportions by weight:

| | |
|---|---|
| Polyglycol | 5 to 8 |
| Paraffin | 4 to 10 | the third layer consists essentially of about the following portions by weight:

| | |
|---|---|
| Epsom salt | 59 |
| Fused granular borax glass | 19 |
| Acetic acid (about 40% concentration) | 9.6 | and the fourth layer consists essentially of about the following proportions by weight:

| | |
|---|---|
| Sodium borate | 0.4 |
| Paraffin oil | 12.0 |

4. Artificial snow according to claim 2 wherein the second layer consists essentially of about the following proportions by weight:

| | |
|---|---|
| Polyglycol | 5 to 8 |
| Paraffin | 4 to 10 | the third layer consists essentially of the following portions by weight:

| | |
|---|---|
| Epsom salt | 39 |
| Fused granular borax glass | 39 |
| Acetic acid (about 40% concentration) | 9.6 | and the fourth layer consists essentially of about the following proportions by weight:

| | |
|---|---|
| Sodium borate | 0.4 |
| Paraffin oil | 12.0 |

5. A method of producing artificial snow comprising the steps of (1) mixing from about 68 to 82 parts by weight fused granular borax glass with 9 to 18 parts by weight acetic acid, (2) spreading the mixture thus formed on the ground and smoothing its upper surface, (3) spreading a mixture of paraffin and a member selected from the group consisting of lard oil and polyglycol on the smooth surface of the mixture of step 2, (4) spreading a granular mixture of borax glass, epsom salt, and acetic acid on the product of step 3, and (5) applying a mixture of sodium borate and paraffin oil to the product of step 4.

6. An artificial ice comprising a first layer of from about 68–82 parts by weight fused granular borax glass, said borax glass being coated with from about 9–18 parts by weight acetic acid, and a second layer of about 4–10 parts by weight paraffin and about 5–8 parts by weight polyglycol on the surface of said first layer.

7. An artificial ice according to claim 6 wherein said first layer contains up to 7 parts by weight epsom salt.

References Cited in the file of this patent

UNITED STATES PATENTS

| 337,128 | Calantarients | Mar. 2, 1886 |
| 494,468 | Dowald | Mar. 28, 1893 |
| 517,823 | Mead | Apr. 3, 1894 |
| 2,179,664 | MacBride | Nov. 14, 1939 |
| 2,870,030 | Stradley | Jan. 20, 1959 |
| 2,907,680 | Smith | Oct. 6, 1959 |
| 2,920,972 | Godron | Jan. 12, 1960 |

FOREIGN PATENTS

| 250,087 | Germany | 1912 |
| 18,867 | Great Britain | 1913 |
| 336,218 | Great Britain | 1930 |

OTHER REFERENCES

The Condensed Chemical Dictionary, 5th edition, pp. 167 and 996, Reinhold Publishing Corp., New York, 1956.